United States Patent [19]
Wasak

[11] Patent Number: 5,657,507
[45] Date of Patent: Aug. 19, 1997

[54] WINDSHIELD CLEANING TOOL

[76] Inventor: Wojciech Wasak, 313 - 131 West 4th Avenue, North Vancouver, British Columbia, Canada, V7M 3L8

[21] Appl. No.: 717,870

[22] Filed: Sep. 23, 1996

Related U.S. Application Data

[63] Continuation of Ser. No. 508,907, Jul. 28, 1995, abandoned.

[51] Int. Cl.⁶ .................... A47L 1/06; A47L 1/15
[52] U.S. Cl. .............. 15/220.1; 15/104.94; 15/144.1; 15/244.2; 15/257.01; 15/223; 15/232
[58] Field of Search .................... 15/208, 209.1, 15/210.1, 210.5, 144.1, 104.93, 104.94, 219, 220.1, 223–226, 228, 231, 232, 244.2, 257.01, 257.05

[56] References Cited

U.S. PATENT DOCUMENTS

| | | | |
|---|---|---|---|
| 1,084,184 | 1/1914 | Wenieke . | |
| 1,142,609 | 6/1915 | Neydhart | 15/232 |
| 1,378,243 | 5/1921 | Kracke | 15/220.1 |
| 2,694,212 | 11/1954 | McGraw . | |
| 3,015,834 | 1/1962 | Marrinson et al. | 15/104.94 |
| 3,077,627 | 2/1963 | Ashworth | 15/228 |
| 3,261,049 | 7/1966 | Murphy | 15/231 |
| 3,383,158 | 5/1968 | Leland | 15/210.1 |
| 3,495,918 | 2/1970 | Leland | 15/144.1 |
| 4,224,713 | 9/1980 | Trent | 15/210.1 |
| 4,593,427 | 6/1986 | Ortolivo | 15/227 |
| 4,807,322 | 2/1989 | Littledeer | 15/121 |
| 4,963,046 | 10/1990 | Eguchi | 15/167.1 |
| 5,095,574 | 3/1992 | Khanzadian | 15/118 |

FOREIGN PATENT DOCUMENTS

| | | | |
|---|---|---|---|
| 51102 | 12/1935 | Denmark | 15/231 |
| 458655 | 11/1991 | European Pat. Off. | 15/220.1 |
| 533181 | 9/1931 | Germany | 15/223 |
| 147527 | 7/1920 | United Kingdom | 15/223 |
| 406800 | 3/1934 | United Kingdom | 15/231 |
| 1033314 | 6/1966 | United Kingdom | 15/244.2 |

*Primary Examiner*—Mark Spisich
*Attorney, Agent, or Firm*—Norman M. Cameron

[57] ABSTRACT

A windshield cleaning tool includes a cleaning member which is preferably triangular in shape with rounded corners and a bottom with a corrugated cleaning surface. There is a handle member hingedly connected to the top of the cleaning member. Preferably the cleaning member has a rounded front, first and second sides diverging away from the front and a back extending between the sides. The bottom of the cleaning member has a plurality of corrugations which may be transverse with respect to a center line. There may be a chamois-like outer layer and a foam inner layer on the bottom of the cleaning member.

12 Claims, 5 Drawing Sheets

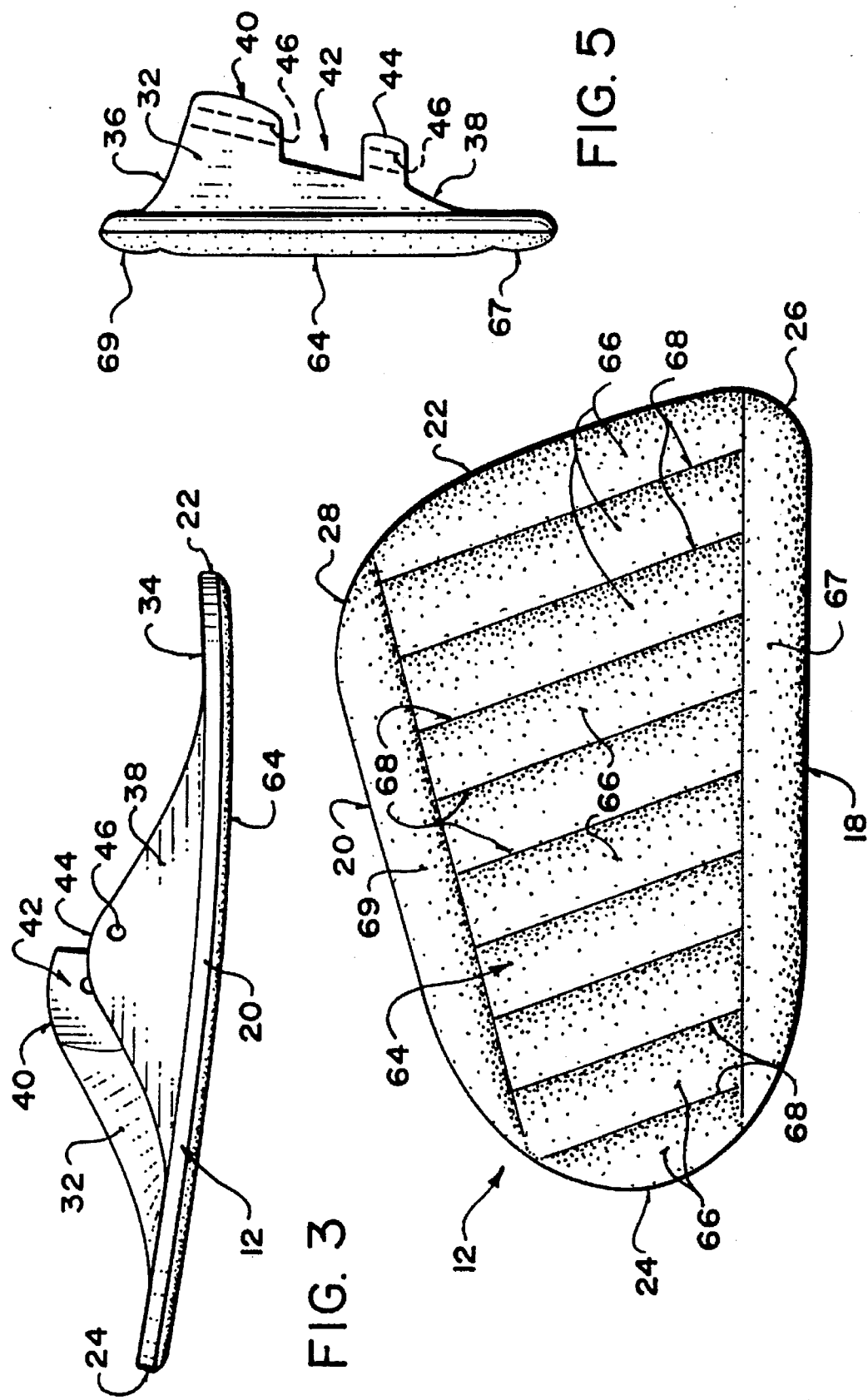

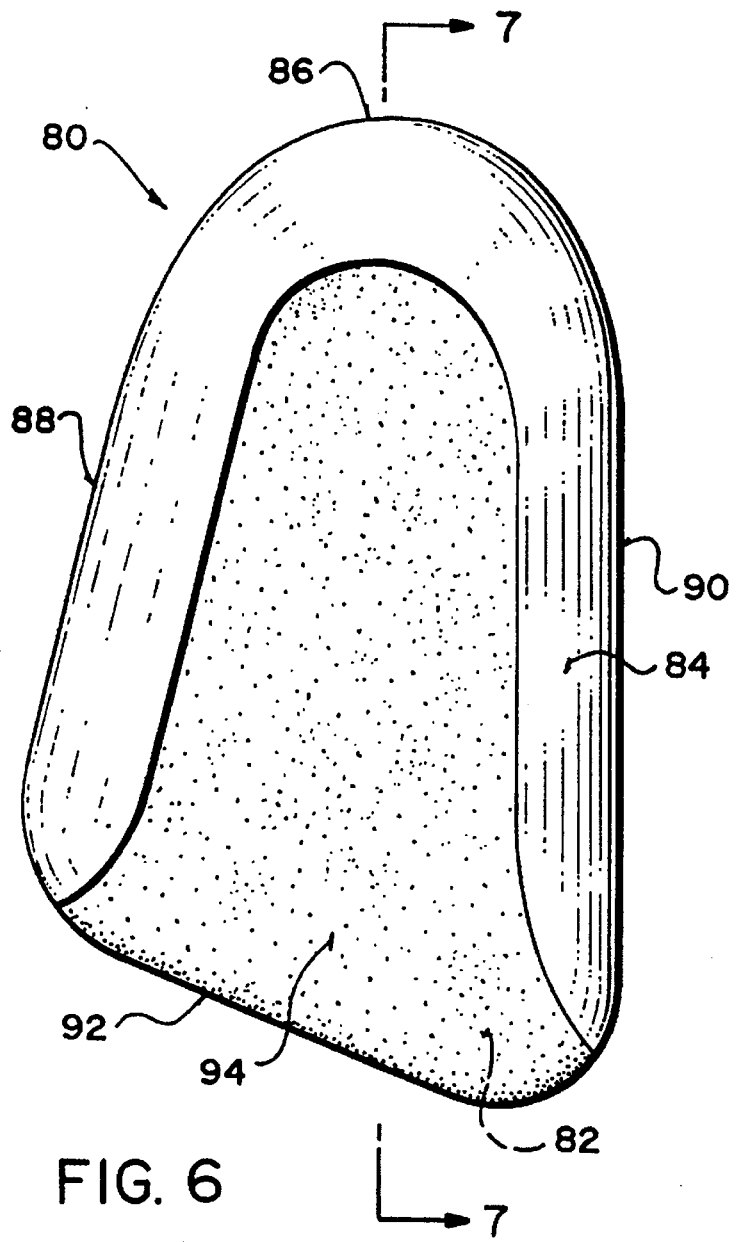
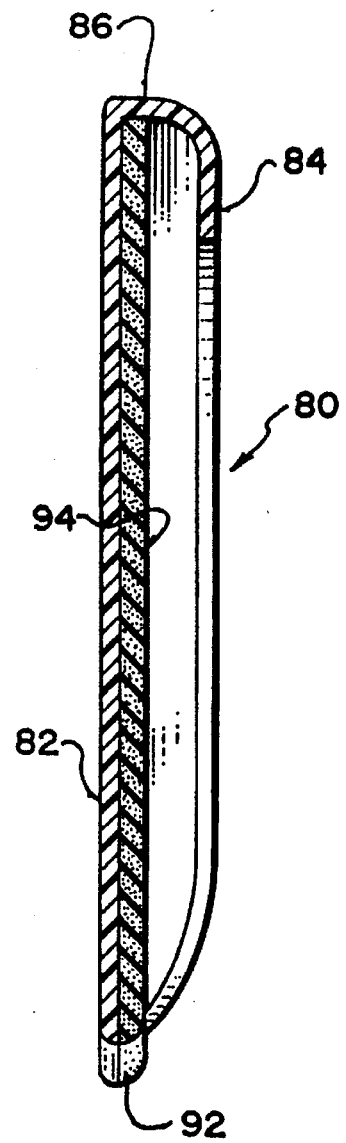
FIG. 6
FIG. 7

5,657,507

WINDSHIELD CLEANING TOOL

CROSS REFERENCE TO RELATED APPLICATION

This application is a continuation of application Ser. No. 08/508,907, filed 28 Jul. 1995, now abandoned.

BACKGROUND OF THE INVENTION

This invention relates to tools for cleaning automobile windshields, in particular the inside surfaces of windshields.

DESCRIPTION OF RELATED ART

Automobile drivers are familiar with the haze which commonly forms on the insides of automobile windshields. Often this haze is formed by an oily residue. As a result, visibility can be substantially reduced in certain conditions, such as during night driving, during rain or against a low angle, strong light source such as the rising or setting sun. Driving may be unpleasant or even dangerous during such conditions. The oily film build-up can produce a substantial and undesirable multi-directional light refraction. In addition, some degree of light dispersion can take place due to streaks and smudges developed in the oily film.

However, proper cleaning of the interiors of windshields is difficult due to their angular orientation, their curved shape and relatively large size. Proper cleaning has required a substantial amount of time and effort and thus is a task too frequently ignored. When performed, the job is typically done using window cleaners and sponges, rags or paper towels.

A number of devices have been developed in the past for cleaning windshields, usually for the outside, typically including a sponge on one side and a rubber wiping blade on the other and mounted on handle. However these devices are not well adapted for cleaning the inside surfaces of windshields where dripping liquids will fall on the dashboard.

Devices have been specifically devised for the inside surfaces of windshields such as disclosed in U.S. Pat. No. 5,095,574 to Khanazadian. This includes a rectangular member having a flat cleaning surface on each side, one being provided with a plurality of sheets of paper and the other with a sponge. A C-shaped handle is connected to one end of the member.

Another generally similar device is the glass cleaner found in U.S. Pat. No. 1,084,184 to Wenieke. Here the cleaning member is rectangular and the handle is hingedly connected to opposite sides thereof.

U.S. Pat. No. 2,694,212 to McGraw shows a somewhat similar device where the handle is connected to the back of a sponge.

U.S. Pat. No. 4,224,713 shows a generally similar device intended for applying paints or the like.

A scouring glove with an abrading surface is shown in U.S. Pat. No. 4,593,627. U.S. Pat. No. 4,807,332 to Littledeer shows a grate-like surface on an automobile windshield cleaning tool.

However none of the prior art devices has received widespread acceptance in the marketplace in that very few vehicles carry devices of this nature for cleaning the interior surfaces of windshields.

SUMMARY OF THE INVENTION

It is an object of the invention to provide an improved tool for cleaning the interior surfaces of automobile windshields which overcome the disadvantages encountered with prior art devices.

It is also an object of the invention to provide an improved tool for cleaning the inside surfaces of automobile windshields which is easy and convenient to use.

It is a further object of the invention to provide an improved tool for cleaning the inside surfaces of automobile windshields which is capable of conforming to the shapes of the surfaces to be cleaned and adequately cleaning to the very corners and edges thereof.

It is a still further object of the invention to provide an improved tool for cleaning windshields which does not require liquids to perform a satisfactory cleaning operation.

In accordance with these objects, there is provided a windshield cleaning tool having a cleaning member. The member has a top and a bottom with a corrugated cleaning surface. It has a rounded front, first and second sides diverging away from the front, a back extending between the sides and a center line extending rearwardly from the front between the two sides. A handle is hingedly connected to the top of the cleaning member. The handle is angled rearwardly with respect to the center line towards the second side and away from the first side.

The cleaning member may be triangular with rounded corners

In the preferred form of the invention, the bottom of the cleaning member has a plurality of corrugations. Preferably there are corrugations transverse with respect to the center line. The bottom of the cleaning member may be padded with a chamois-like outer layer.

BRIEF DESCRIPTION OF THE DRAWINGS

In the drawings:

FIG. 3 is a side view thereof with the handle removed;

FIG. 4 is a bottom plan of the cleaning member thereof;

FIG. 5 is an end view of the cleaning member;

FIG. 6 is a top plan of the case therefor;

FIG. 7 is a side sectional view of the case taken along line 7—7 of FIG. 6;

DESCRIPTION OF THE PREFERRED EMBODIMENTS

Figure 1:
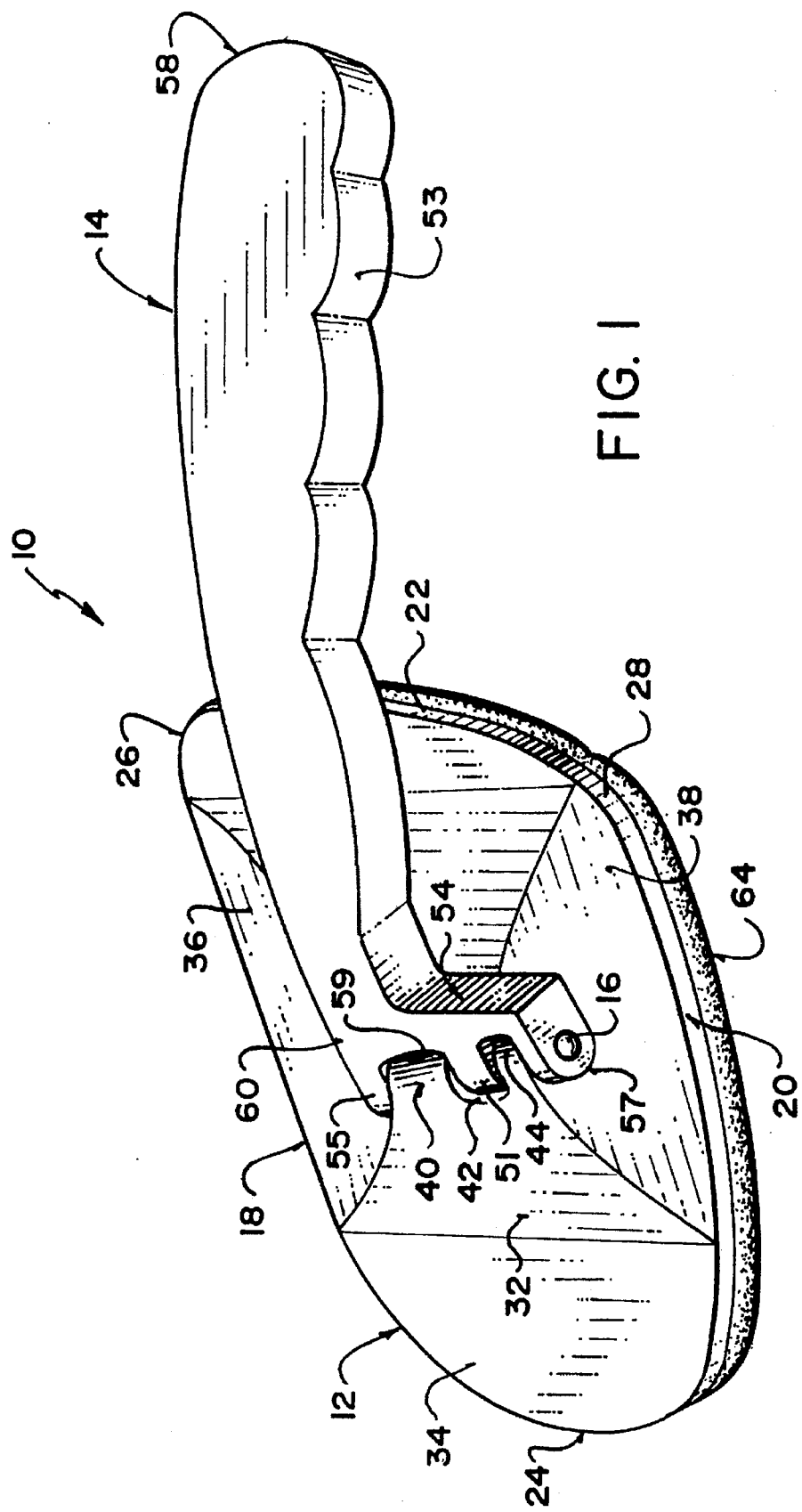
FIG. 1 is an isometric view of a windshield cleaning tool according to an embodiment of the invention.

Referring to the drawings, these show a windshield cleaning tool 10 according to an embodiment of the invention. The tool has two principal components, namely a cleaning member 12 and a handle member 14 which are hingedly interconnected by a hinge pin 16.

Figure 2:
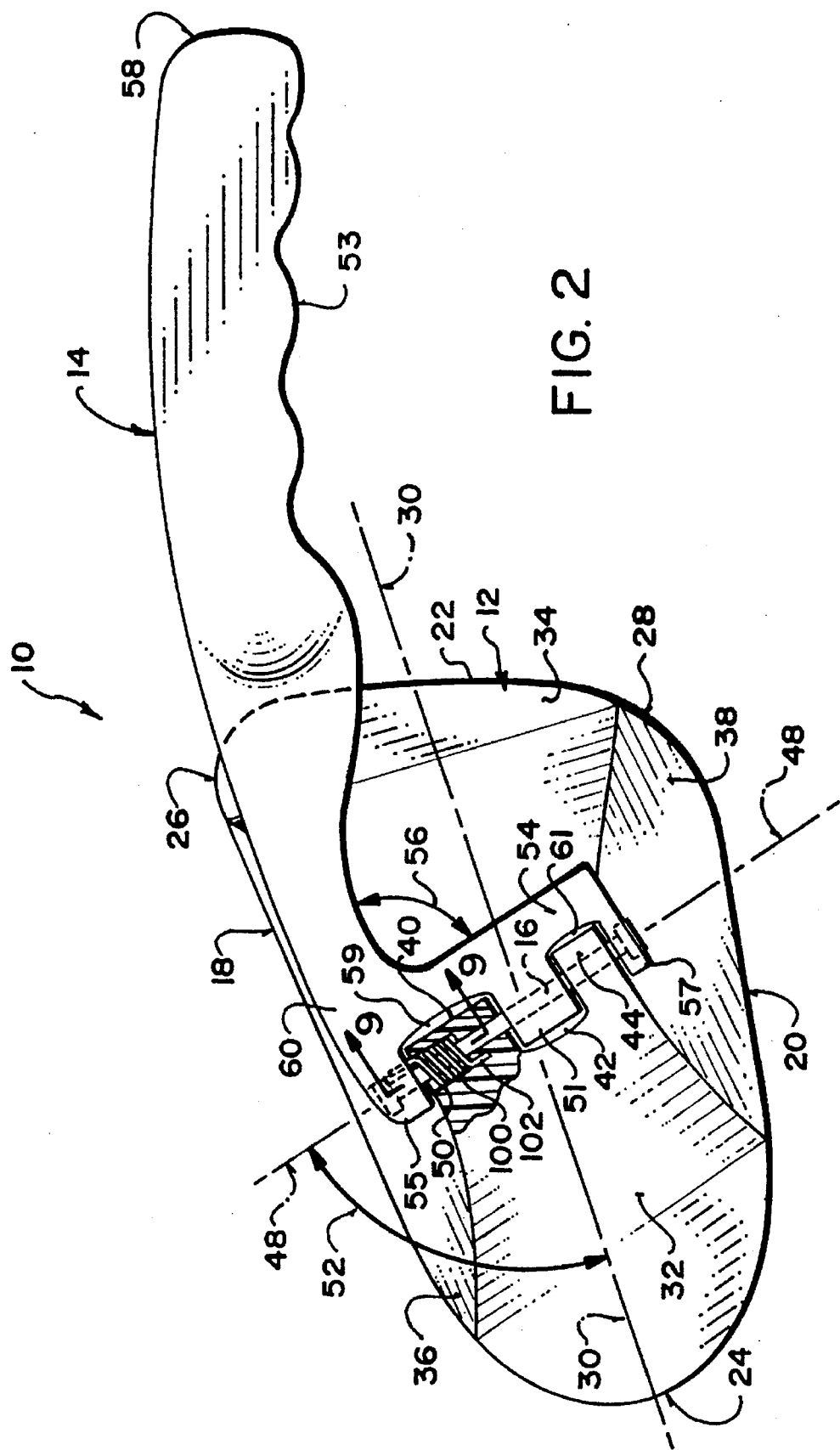
FIG. 2 is a top plan thereof.

Referring to the cleaning member 12 in more detail, it is generally triangular in shape as best seen in FIG. 2. There are two sides 18 and 20 and a back 22. There is a rounded front 24, forming one corner of the triangle, and two rounded corners 26 and 28 between the sides and the back. It may be seen that the sides 18 and 20 diverge away from the front 24 towards the back 22. The cleaning member has a center line 30 which extends rearwardly from the front 24 between the two sides.

There is a raised area 32 on top 34 of the cleaning member as seen best in FIG. 3. Surfaces 36 and 38, shown in FIGS.

1 and 2, slope downwardly from the raised area 32 towards the sides 18 and 20 of the cleaning member.

Figure 9:
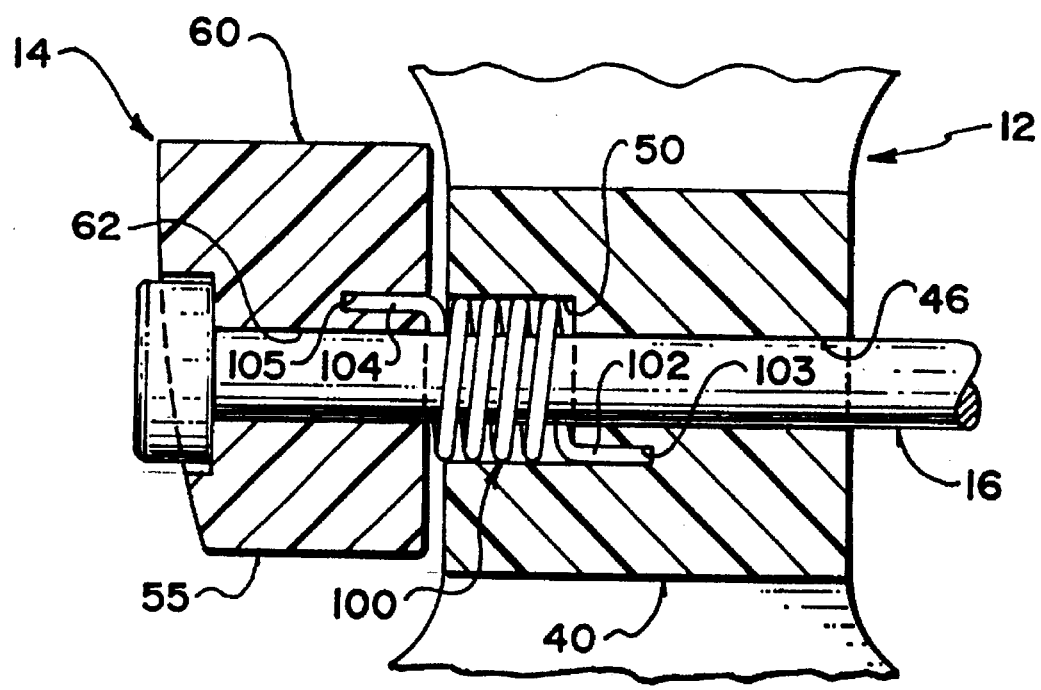
FIG. 9 is a sectional view taken along line 9—9 of FIG. 2.

There is a first hinge member 40 formed by the central portion of the raised area including recess 42 extending downwardly from top 44 thereof as seen best in FIG. 5. The recess is generally square in plan with a rounded bottom. The hinge member also includes a bore 46 extending through the hinge member along hinge axis 48 as seen in FIGS. 2, 3 and 9. In this embodiment the bore has a larger diameter section 50 adjacent slope surface 36. It may be seen in FIG. 2 that the hinge axis 48 forms an acute angle 52 with respect to center line 30 of the cleaning member. In this embodiment the angle is approximately 75° although this is not critical.

The handle member 14 includes an elongated handgrip 53 extending outwardly from a second hinge member 54 at an acute angle 56 as best seen in FIG. 2. The handle member has a distal end 58 and a proximal end 60 adjacent the second hinge member 54. There is a bore 62 through the second hinge member which is aligned with bore 46 of the first hinge member to receive the hinge pin 16. The handgrip 53 is angled rearwardly from the hinge member so that it is directed towards the second side 20 of the cleaning member and away from the first side. The handle may be pivoted approximately 180° anti-clockwise from the position shown in FIG. 1.

The second hinge member includes a protrusion 51 shaped to fit rotatably within recess 42. There are protrusions 55 and 57, best shown in FIG. 1, spaced apart from protrusion 51 by recesses 59 and 61. The protrusions 55 and 57 extend over the sides of hinge member 40 while the recesses straddle it.

As shown best in FIG. 9, there is a torsional coil spring 100 located within large diameter section 50 of bore 46 in the cleaning member which biases the handle member towards the position of FIG. 1. One end 102 of the spring engages socket 103 of the cleaning member 12 and the other end 104 of the spring engages the socket 105 in the proximal end 60 of the handle member 14. The coil spring is locked in the bore 46 and biases the handle member towards the cleaning member.

The cleaning operation is performed by bottom 64 of the cleaning member 12. As seen best in FIGS. 4, 5 and 8, the bottom of the cleaning member is corrugated with a plurality of parallel ribs 66. In this particular example there are ten such ribs 66 although this number is not critical. The ribs 66 are outwardly rounded and are separated by grooves 68. The ribs 66 are transverse with respect to the center line 30 of the cleaning member. There are two similar ribs 67 and 69 extending along the sides 18 and 20 parallel thereto.

Figure 8:
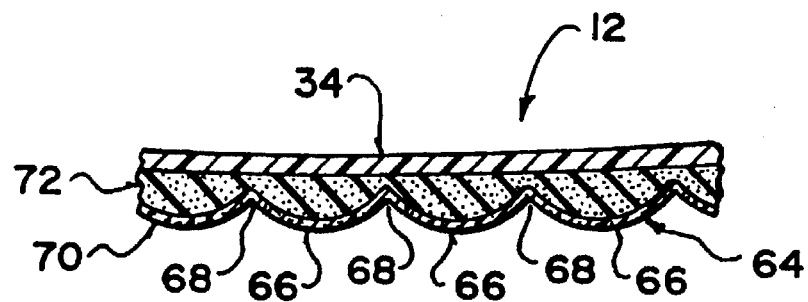
FIG. 8 is a fragmentary side section of the cleaning member.

The bottom is padded in this example including an outer chamois-like layer 70 and an inner layer 72 of synthetic foam rubber in this example as seen in FIG. 8. The outer layer may be actual chamois, a similar leather, a synthetic substitute or a soft cloth. Other types of padding can be used in place of the foam layer. Alternatively, both layers can be replaced by a single layer of molded foam rubber or the like although such a structure is less preferred.

In this preferred example, the tool 10 is provided with a case 80 shown in FIGS. 6 and 7. The case has an outline similar in shape to the cleaning member as may be seen by comparing FIG. 6 and FIG. 2. The case may be made of a variety of materials, but a pliable, semi-rigid plastic is employed in this preferred embodiment. There is a flat bottom 82 similar in shape to the bottom of the cleaning member. There is a raised, inwardly directed U-shaped edge 84 extending about front 86 of the case and along both sides 88 and 90. Back 92 of the case is open. There is a pad 94 forming the inside surface of the bottom 82 as best seen in FIG. 7. In this preferred embodiment the pad is impregnated with a powdered cleaning composition, including 37% ultra fine titanium oxide, 60% ultra free, calcium carbonate as well as 1% ultra fine potassium oxide and 2% ultra fine phosphorus oxide, all by weight.

The cleaning member 12 may be inserted into the case 80 by sliding its from 24 from back 92 of the case towards its front 86. Bottom 64 of the cleaning member becomes impregnated and coated with the cleaning composition upon inserting and removing the cleaning member from the case.

In use, the tool 10 is first removed from the case 80 and held by handgrip 53 of the handle member 14. Bottom 64 of the cleaning member is pressed against the windshield. The convex shape of the bottom, best seen in FIG. 3, ensures proper contact with the typically concave shape of a windshield interior. The user presses the tool against the windshield by means of the handle 14 and rotates the cleaning member while moving it about the windshield. The ribs 66 and 67 on the bottom tend to distribute the force applied by the user in a special way. The foam layer 72 and the construction of the ribs 66 and 67 allow for a reduction of the friction between the tool and the windshield due to reduced total contact surface during a typical cleaning procedure. Under certain circumstances in order to remove some hardened deposits, the user of the tool tends to apply an extra pressure to the handle, consequently transferring the force over the entire bottom 64. The extra force creates a compression of the ribs, expanding the total contact surface of the bottom 64 and allowing, momentarily, for better efficiency of the cleaning process during removal of the hardened or accumulated deposits. Hence, the increased contact surface increases the friction between the windshield and the tool. However, the compressed ribs react adversely to the force of compression so that the user of the tool unconsciously bears a variable pressure against the windshield, allowing for a uniform and improved cleaning operation.

The chamois-like layer 70, preferably with the cleaning composition mentioned above, removes the haze, film or other material from the windshield. The shape of the cleaning member, particularly the curved front 24 and different shaped angular corners 26 and 28 facilitate the ability of the tool to reach into virtually every corner and recess to properly clean the entire interior of the windshield. The shape of the handle member, its angular orientation with respect to the hinge pin 16 and the angular orientation of the hinge pin itself with respect to the center line of the cleaning member, facilitate proper cleaning even when the user reaches to the most distant point on the windshield in order to complete the cleaning operation.

The spring 100 creates a resilient force between the cleaning member and the handle when the handle is lifted from its position against the cleaning member. This force helps to bring the tool from a distal end of the windshield to an end near the user. It also helps to restore the handle to the proper position for storing in the case.

It will be understood by someone skilled in the art that many of the details described above can be varied or deleted without departing from the scope of the invention which is to be interpreted with reference to the following claims.

What is claimed is:

1. A windshield cleaning tool, comprising:
    a cleaning member having a top and a bottom with a corrugated cleaning surface, the cleaning member having a rounded front, first and second sides diverging away from the front, a back extending between the sides and a center line extending rearwardly from the front between the two sides; and a handle member hingedly connected to the top of the cleaning member, the handle member being angled rearwardly with respect to the center line towards the second side and away from the first side.

2. A tool as claimed in claim 1, wherein the cleaning member is triangular in shape with rounded corners.

3. A tool as claimed in claim 1, wherein the handle member is connected to the cleaning member by a hinge.

4. A tool as claimed in claim 3, wherein the hinge has a hinge axis at an acute angle with respect to the center line.

5. A tool as claimed in claim 4, wherein the handle member is an elongated member extending away from the hinge axis at an acute angle.

6. A tool as claimed in claim 5, wherein the handle member is angled inwardly with respect to the cleaning member.

7. A tool as claimed in claim 1, wherein the bottom of the cleaning member has a plurality of corrugations.

8. A tool as claimed in claim 1, wherein the bottom of the cleaning member has a plurality of corrugations and at least some of the corrugations are transverse with respect to the center line.

9. A tool as claimed in claim 8, wherein the cleaning member has sides and some of the corrugations extend along the sides of the cleaning member.

10. A tool as claimed in claim 9, wherein the bottom of the cleaning member has a padded outer member.

11. A tool as claimed in claim 10, wherein the outer member includes a chamois-like outer layer and a foam inner layer.

12. A windshield cleaning tool comprising:

a generally triangular cleaning member having a top, a bottom, a rounded front, sides diverging rearwardly away from the front, a back, rounded corners between the back and the sides, a center line extending rearwardly from the front between the sides, a raised first hinge member having a hinge axis at an acute angle with respect to the center line, and a bottom having a plurality of corrugations thereon with a chamois-like surface, the bottom being padded;

a handle member having a proximal end with a second hinge member complementary in shape to the first hinge member and being received on the first hinge member for pivotal movement about the hinge axis, and an elongated handgrip extending from the second hinge member at an acute angle with respect to the hinge axis; and a hinge pin interconnecting the hinge members and extending along the hinge axis.

\* \* \* \* \*